United States Patent
Wang et al.

(10) Patent No.: US 8,487,235 B2
(45) Date of Patent: Jul. 16, 2013

(54) PHOTOELECTRIC SENSOR FOR SENSING A TARGET AT A PREDETERMINED LOCATION

(75) Inventors: Jianhua Wang, Shanghai (CN); Dennis C. Mackey, Hamilton, MA (US); Jianyong Liao, Shanghai (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 316 days.

(21) Appl. No.: 12/422,476

(22) Filed: Apr. 13, 2009

(65) Prior Publication Data

US 2010/0258711 A1     Oct. 14, 2010

(51) Int. Cl.
*G06M 7/00* (2006.01)
*H01J 3/14* (2006.01)
*G01C 3/08* (2006.01)

(52) U.S. Cl.
USPC .................. 250/221; 250/216; 356/4.01

(58) Field of Classification Search
USPC .............. 250/221, 559.01, 559.04, 559.07, 250/559.08, 559.15–559.17, 559.4–559.46, 250/559.19, 559.22, 559.27, 216, 239; 356/3–22, 503, 601, 625, 630–632, 634, 356/429, 600, 635; 396/89, 111, 115, 119–121, 396/125
See application file for complete search history.

(56) References Cited

U.S. PATENT DOCUMENTS

| | | | | |
|---|---|---|---|---|
| 4,760,419 A | * | 7/1988 | Fujiwara et al. | 396/99 |
| 5,221,955 A | * | 6/1993 | Inoue | 356/3.01 |
| 5,233,382 A | * | 8/1993 | Taniguchi et al. | 396/113 |
| 5,373,344 A | * | 12/1994 | Kakiuchi | 396/106 |
| 6,522,393 B2 | * | 2/2003 | Higashino | 356/3.03 |
| 6,611,318 B2 | * | 8/2003 | LaPolice | 356/3.03 |
| 7,889,503 B2 | | 2/2011 | Nagareda et al. | |
| 2002/0180956 A1 | * | 12/2002 | Barker | 356/121 |
| 2004/0263824 A1 | * | 12/2004 | Yamamoto et al. | 356/3.14 |

FOREIGN PATENT DOCUMENTS

| | | |
|---|---|---|
| CN | 101137282 A | 3/2008 |
| DE | 10238075 A1 | 3/2004 |
| DE | 202005021032 U1 | 1/2007 |
| DE | 102006057878 A1 | 4/2008 |

OTHER PUBLICATIONS

Banner Engineering Corp.; QS30 Series Diffuse-Mode Laser Sensor; Minneapolis, MN; Oct. 2002; 12 pages; www.bannerengineering.com.

(Continued)

*Primary Examiner* — Pascal M Bui Pho
(74) *Attorney, Agent, or Firm* — Whyte Hirschboeck Dudek S.C.; William R. Walbrun; John M. Miller

(57) ABSTRACT

A photoelectric sensor and method for sensing a target at a predetermined location. The photoelectric sensor includes a light source that emits light, an output circuit including first and second photodetectors, and first and second receive lenses respectively positioned adjacent to the first and second photodetectors, respectively. If the target is at the predetermined location, then a first portion of the emitted light is received by the first photodetector after being reflected off of the target and passing through the first receive lens, and a second portion of the emitted light is received by the second photodetector after being reflected off of the target and passing through the second received lens. Further, the output circuit produces an output signal indicative of a sensed characteristic of the target based on signals generated by the first and the second photodetectors.

23 Claims, 9 Drawing Sheets

OTHER PUBLICATIONS

PHOTOSWITCH Photoelectric Sensors, 45 MLD, Laser Diffuse Sensors, Allen-Bradley, Jun. 2004; 2 pages.
PHOTOSWITCH Photoelectric Sensors, Introduction; Allen-Bradley, Jun. 2004, pp. 1-21 to 1-30.
Application No. EP 10159736, European Search Report dated Aug. 12, 2010; 7 pages.
Application No. CN 201010151202.8, office action dated Jun. 29, 2011; 11 pages.
Application No. CN 201010151202.8, office action dated Feb. 14, 2012; 9 pages.
Application No. CN 201010151202.8, office action dated Sep. 9, 2012; 8 pages.

* cited by examiner

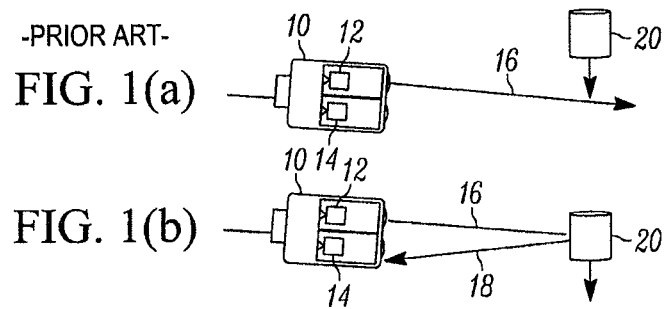
-PRIOR ART-
FIG. 1(a)
FIG. 1(b)
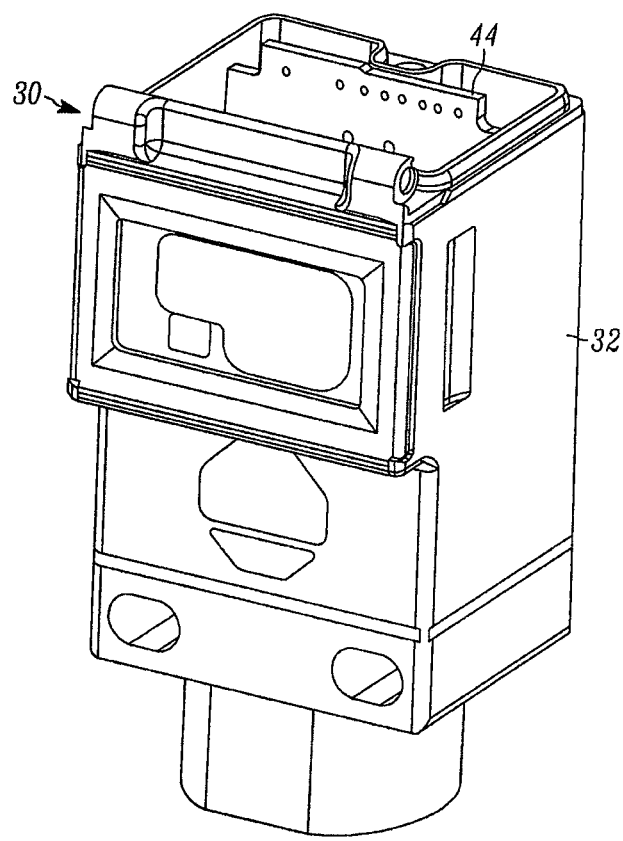
FIG. 2

FIG. 5(c) Section C-C

FIG. 5(b) Section B-B

PHOTOELECTRIC SENSOR FOR SENSING A TARGET AT A PREDETERMINED LOCATION

FIELD OF THE INVENTION

The present invention relates to sensors, and in particular, to photoelectric sensors.

BACKGROUND OF THE INVENTION

Photoelectric sensors use light to sense targets without physical contact and are used in a wide variety of applications and environments, such as to sequentially detect the presence of objects on a conveyor belt, or to detect a change in the size, shape, reflectivity, or color of a target. Various types of photoelectric sensors are available, including transmitted beam sensors, retro-reflective sensors, and diffuse sensors. Each of these sensors includes a light source, such as a light emitting diode (LED) or a laser, and a photodetector for detecting light, such as a photodiode or a phototransistor, and can also include one or more lenses to focus the light emitted by the light source and/or to focus the received light for efficient detection by the photodetector. These sensors typically also include output circuitry in communication with the photodetector for producing a voltage or a current signal indicative of a characteristic of the sensed target, such as a high or low state for indicating the presence of a target at a predetermined location.

A transmitted beam type photoelectric sensor is arranged such that the light source is located on one side of a path of a target to be sensed, and the photodetector is located on the other side of the path. A light beam from the light source is directed to the photodetector, and when the target is absent, the light from the light source is detected at the photodetector. When the target is at a predetermined location, it partially or completely blocks this light beam from being received by the photodetector. A resulting change in the amount of light detected by the photodetector gives rise to an output signal indicative of the presence of the target.

As for the retroreflective and diffuse type sensors, both of these sensor types combine a light source and a photodetector in a single housing. A retroreflective type sensor uses a reflector located on an opposite side of a path of a target to be sensed, and this reflector reflects a light beam from the light source back to the photodetector. The presence of the target partially or completely blocks this light beam from being received by the photodetector. As shown in FIGS. 1(a) and 1(b) (prior art), a diffuse type sensor 10 operates by directing a light beam 16 towards a predetermined location on a light path and using a target 20 itself, when at the predetermined location (as shown particularly in FIG. 1(b)), to reflect a portion of the light beam 16 from the light source 12 back to the photodetector 14, which then detects more light than when the target is not at the predetermined location (as shown particularly in FIG. 1(a)). In particular, when the target 20 is present at the predetermined location, the light beam 16 strikes the target 20 at some arbitrary angle and is detected when the photodetector captures some portion of the reflected diffused light 18. Diffuse type sensors are well suited for applications with space requirements that limit the positioning of a reflector across from the photodetector.

Successful sensing requires that a change in the position, size, shape, color, or reflectivity of the target causes a sufficient measurable change in the amount or intensity of light detected by the photodetector. The performance of a photoelectric sensor detecting the presence and absence of a target can be quantified using the concept of margin or excess gain. Margin is a measurement of the amount of light from the light source that is detected by the photodetector compared to a minimum light level required to switch the output signal of the sensor (such as from a level indicative of the absence of a target to a level indicative of the presence of a target), and can also take into account a sensitivity of an output circuit. A margin value corresponds to a specific sensing distance between a target to be sensed and the sensor. A margin of zero occurs when none of the light emitted by the light source can be detected by the photodetector, and a margin of one occurs when just enough light is detected to cause the output signal of the sensor to change states. A margin of twenty (commonly expressed as 20×) can occur when twenty times the minimum light level required to switch the output signal of the sensor is detected by the photodetector, or can occur for example when 4 times the minimum light level is detected and the sensitivity of an output circuit is 5 times the sensitivity at the minimum light level. The higher the margin, the more capable a photoelectric sensor is at sensing a target at that distance.

Margin is measured and expressed relative to the reflectivity of the reflecting surface, for example relative to a white paper having a reflecting surface rated at 90% reflective, which will reflect more light and therefore allow for a larger margin than a paper surface that is 18% reflective. Typical margin response curves are often provided for a photoelectric sensor and show what the typical margin will be depending on the sensing distance (the sensing distance for a diffuse type sensor is defined as the distance from the sensor to the specified target).

Photoelectric sensors are often characterized in terms of their maximum and minimum sensing distances. For diffuse type sensors, often a "blind area" exists in which a target that is too close to the sensor cannot be sensed because the light reflected from the target cannot be received by the photodetector. For example, with a sensor designed to operate with a target at a sensing distance of up to 800 mm, this blind area can extend from zero to 50 mm. Referring again to FIG. 1(b), in the case of a diffuse sensor, this occurs because the light source and the photodetector are not coaxial so the light 16 emitted by the sensor and the reflected light 18 detectable by the photodetector travel along different paths, with the reflected light 18 typically entering the sensor 10 at an angle with respect to the emitted light. When the target 20 becomes too close to the sensor 10, none of the reflected light can be detected by the photodetector, as the angle between the emitted light and the reflected light becomes too great.

It is desirable that a photoelectric sensor for sensing the presence of a target be operable over a target sensing range that encompasses both a far distance, such as 800 mm, and also a near distance, which preferably extends to zero or as close to zero as possible. With a conventional photoelectric sensor, for a target at a far distance, in order to obtain a sufficient measurable change in the light detected by the photodetector from the target, it may be necessary to increase the intensity of the emitted light, and/or increase the sensitivity of the photodetector. Each of these modifications results in an increased margin corresponding to that far distance, but there are limits on these modifications. Generally, the emit power is limited by characteristics of the light source such as expected life and maximum current, as well as safety considerations in the case of a laser light source. Further, one drawback to increasing the sensitivity is that more EMI (electromagnetic interference) signals (noise) can also be detected by the photodetector, resulting in an inaccurate measurement for a target to be sensed. This can effectively restrict the sensitivity of the photodetector.

Further with a conventional photoelectric sensor, increasing the diameter of a receive lens that directs light to the photodetector can also result in an increased margin by allowing more light to be detected by the photodetector. However, such increases also increase the minimum sensing distance, that is, they limit the photoelectric sensor's ability to sense targets located close to the photoelectric sensor. Referring again to FIG. 1(b), in the case of a diffuse sensor, this occurs because the light source and the photodetector are not coaxial so the light 16 emitted by the sensor and the reflected light 18 detectable by the photodetector travel along different paths, with the reflected light 18 typically entering the sensor 10 at an angle with respect to the emitted light. When the target 20 becomes too close to the sensor 10, none of the reflected light can be detected by the photodetector, as the angle between the emitted light and the reflected light becomes too great. This is especially problematic in the case of a sensor having a laser light source, because the laser emits a narrower beam of light in contrast to the light emitted by a LED. Further, increasing the size of the receive lens also means that more environmental ambient light (light not originating from the light source) can be detected by the photodetector, resulting in an inaccurate measurement for a target to be sensed. With a photoelectric sensor, the light source typically emits pulsed light, so the light signal which is reflected emitted light which is received by the photodetector is also pulsed. A larger receive lens can collect more ambient light which makes it possible that the photodetector can become saturated if the ambient light is strong enough. A saturated photodetector means that the output signal from the photodetector is a constant DC current or voltage, so the received emitted light signal cannot be detected, resulting in another type of "blindness". This can effectively restrict the size of the receiver lens.

For at least these reasons, it would be advantageous if an improved photoelectric sensor could be developed that overcame one or more of the above disadvantages. It would be further advantageous in particular if, in at least some such embodiments, the improved photoelectric sensor had a sufficient margin over a sensing range that included regions very close to (and possibly right up to) the sensor. It would also be advantageous if, in at least some such embodiments, the improved sensor could operate in the presence of ambient light, such as up to at least 5,000 lux, and preferably to 50,000 lux, and was relatively unaffected by EMI over its sensing range, especially with a sensor using a laser light source.

BRIEF SUMMARY OF THE INVENTION

The present inventors have recognized the desirability of an improved photoelectric sensor in view of the above considerations, and have further recognized that one of the difficulties in achieving desired photoelectric sensor performance over a wide sensing range is a result of the significant variation in the angular direction of the reflected light returning to the photoelectric sensor depending upon the distance between the sensor and a given target being sensed. The present inventors have additionally realized that the problems associated with such variation in the angular direction of reflected light can, in at least some embodiments, be ameliorated or entirely eliminated by integrating multiple photodetectors and receive lenses in a single photoelectric sensor that, in addition to sending out and receiving reflected light, also processes the information coming from the multiple photodetectors to better determine the presence of targets at a variety of distances from the photoelectric sensor. Each receive lens is selected to be operable with its corresponding photodetector to sense the target over a corresponding range of distances between the target and the photoelectric sensor.

In at least some embodiments, the present invention relates to a photoelectric sensor for sensing a target. The sensor includes a light source that emits light, an output circuit including first and second photodetectors, first and second receive lenses respectively positioned adjacent to the first and second photodetectors, respectively, and a support structure for supporting each of the light source, the photodetectors, and the receive lenses in relation to one another. If the target is at the predetermined location, a first portion of light emitted by the light source is received by the first photodetector after being reflected off of the target and passing through the first receive lens, and a second portion of light emitted by the light source is received by the second photodetector after being reflected off of the target and passing through the second receive lens. Further, the output circuit produces an output signal indicative of a sensed characteristic of the target based on signals generated by the first and the second photodetectors in response to the portions of the light arriving at the photodetectors.

Additionally, in at least some embodiments, the present invention relates to a diffuse type photoelectric sensor for sensing a target at a predetermined location. The sensor includes a light source for emitting light, an output circuit including a first photodetector and a second photodetector, a first receive lens positioned adjacent to the first photodetector, and a second receive lens positioned adjacent to the second photodetector. The sensor also includes an optical holder for holding the first receive lens and the second receive lens, the optical holder including a first aperture and a second aperture. If the target is at the predetermined location at a distance from the sensor which is within a first range, then a first portion of light emitted by the light source is received by the first photodetector after being reflected off of the target and passing through the first receive lens and the first aperture. If the target is at the predetermined location at a distance from the sensor which is within a second range, then a second portion of light emitted by the light source is received by the second photodetector after being reflected off of the target and passing through the second receive lens and the second aperture. Additionally, the output circuit produces an output signal indicative of a sensed characteristic of the target based on signals generated by the first and the second photodetectors in response to light received by the photodetectors.

Further, in at least some embodiments, the present invention relates to a method for detecting a presence of a target at a predetermined location. The method includes emitting light from a light source to be reflected by a target at the predetermined location, receiving by a first photodetector a first portion of the emitted reflected light after passing through a first receive lens, and receiving by a second photodetector a second portion of the emitted reflected light after passing though a second receive lens. The method further includes producing a first quantification signal indicative of the first portion of the emitted light using the first photodetector, producing a second quantification signal indicative of the second portion of the emitted light using the second photodetector; and generating a composite signal based upon both of the first and the second quantification signals, the composite signal being indicative of a presence of the target at the predetermined location.

Other embodiments, aspects, features, objectives and advantages of the present invention will be understood and appreciated upon a full reading of the detailed description and the claims that follow.

BRIEF DESCRIPTION OF THE DRAWINGS

FIGS. 1(a) and 1(b) schematically illustrate the operation of a typical prior art diffuse type photoelectric sensor, with FIG. 1(b) particularly illustrating how a target at a predetermined location reflects a portion of emitted light from the target back to the sensor;

FIG. 2 is a perspective view of an exemplary photoelectric sensor in accordance with at least some embodiments of the present invention;

FIGS. 5(b), 5(c), and 5(d) are respective first, second, and third cross-sectional views of the photoelectric sensor shown in FIG. 2, taken along respective lines B-B, C-C, and D-D of FIG. 5(a);

DETAILED DESCRIPTION OF THE PREFERRED EMBODIMENT

Figure 3A:
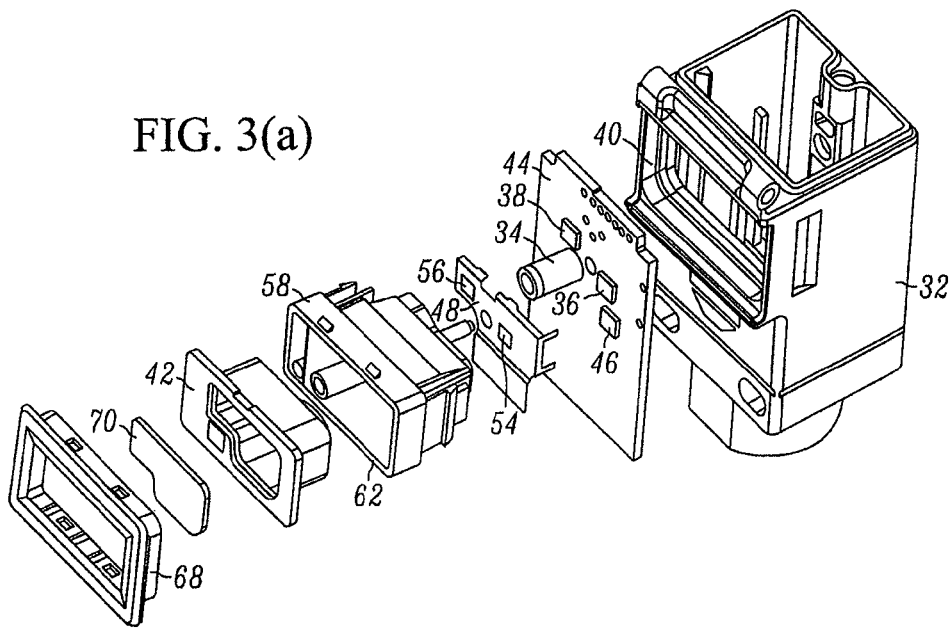
FIGS. 3(a) and 3(b) are respective exploded front and rear perspective views of the sensor shown in FIG. 2.
Figure 3B:
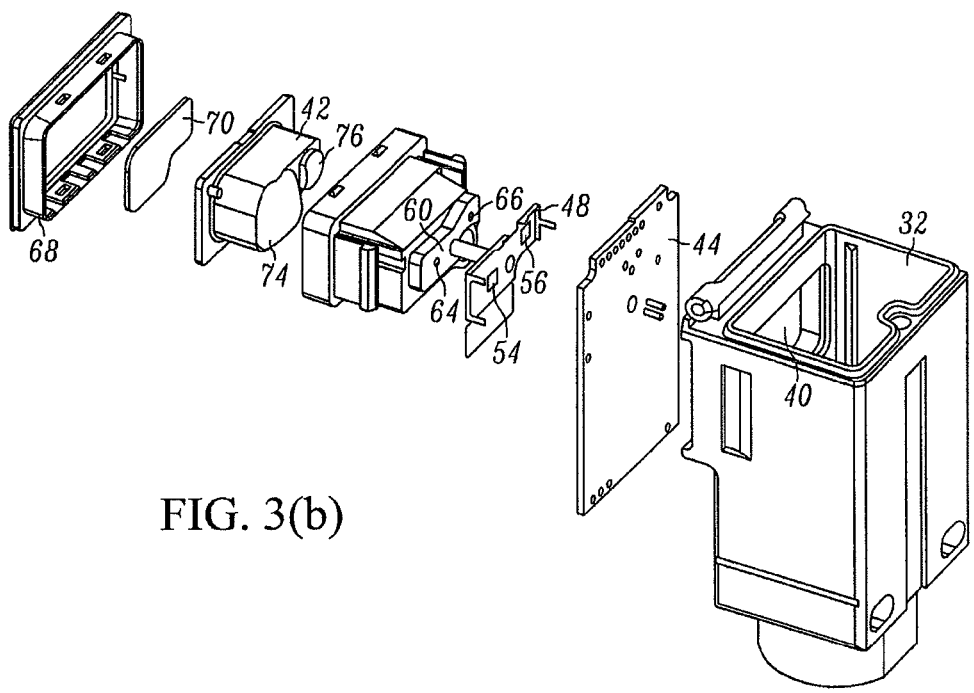

Illustrated in the perspective view, front exploded view, and rear exploded view of respective FIGS. 2, 3(a), and 3(b) is an exemplary photoelectric sensor 30 in accordance with at least some embodiments of the invention. The photoelectric sensor 30 includes various components that are positioned within a housing 32 when the photoelectric sensor 30 is fully assembled as shown in FIG. 2. Among these internal components are a light source 34 for emitting light, a first photodetector 36, and a second photodetector 38. For example, the light source 34 can be a laser which emits a narrow beam of light of a single wavelength or within a narrow frequency band, or an otherwise highly-focused beam of light. Further for example, each photodetector 36, 38 can be a photodiode or a phototransistor.

Although FIGS. 1(a) and 1(b) referred to above show a prior art arrangement particularly employing a prior art photoelectric sensor 10, the manner of light transmission and reflection represented by the light 16, 18 shown there is equally representative of the manner of light transmission and reflection that can be experienced using a photoelectric sensor such as the photoelectric sensor 30 in accordance with at least some embodiments of the present invention. More particularly, when light is emitted from the light source 34 of the photoelectric sensor 30 (when assembled within the housing 32), the emitted light proceeds through a window 40 formed in the housing 32, out of the sensor/housing and toward a predetermined location on a target path (e.g., a path such as that followed by the target 20 shown in FIGS. 1(a) and 1(b), with the predetermined location along that path being the position of the target shown in FIG. 1(b)). Assuming that a target is in fact present at that predetermined location, the target reflects some or all of the emitted light, and a portion of the diffuse reflected light passes back toward the photoelectric sensor 30.

Such incoming diffuse reflected light received at the photoelectric sensor 30 in particular passes through the window 40 and subsequently through a composite lens 42 and various other components as described below, after which it arrives for detection at one or both of the two photodetectors 36 and 38. The photodetectors 36, 38 in the present embodiment are mounted on a printed circuit board 44 (PCB), which also includes other circuit components forming an output circuit 45 (see also FIG. 6). These circuit components can include first and second resistors 50 and 52 (see FIG. 6), whose values determine the corresponding sensitivity of respective photodetectors 36, 38 as described further below. An output signal from the output circuit 45 can then be directed to an application specific integrated circuit (ASIC) 46. A copper shield 48 protects the photodetectors 36, 38 and other circuit components from electromagnetic interference, and a first aperture 54 and a second aperture 56 formed in the copper shield 48 are respectively aligned with the detecting surfaces of the first and the second photodetectors 36, 38.

Light emitted by the light source 34 and passing out of the photoelectric sensor 30, as well as diffuse reflected light received by the photoelectric sensor 10 that is to be measured by the photodetectors 36, 38, both pass through the composite lens 42. As shown particularly in FIGS. 3(a) and 3(b), the composite lens 42 is fitted within an optical holder 58. Both the composite lens 42 and the optical holder 58 are situated within the housing 32 when the photoelectric sensor 30 is fully assembled. Like the copper shield 48, the optical holder 58 includes a first aperture 64 and a second aperture 66, both of which are formed on a back surface 60 of the optical holder 58. The respective apertures 64, 66 are aligned with the respective apertures 54, 56 on the copper shield 48 so as to allow incoming light to pass from the composite lens 42 to the photodetectors 36, 38.

Several other features and components are present within the photoelectric sensor 30 as well. In particular as shown in FIG. 3(a), one or more cavities such as 62 can be provided for one or more sealing rings (not shown). Further, in the present embodiment, a color filter 70 is positioned within the window 40 and within a window frame 68, adjacent to the composite lens 42. Thus, incoming diffuse light received by the photoelectric sensor 30 more particularly proceeds through the window 40 and window frame 68, through the color filter 70, through the composite lens 42, through the apertures 64, 66, 54, 56 of the optical holder 58 and copper shield 48, and finally to one or both of the photodetectors 36, 38.

Figure 4A:
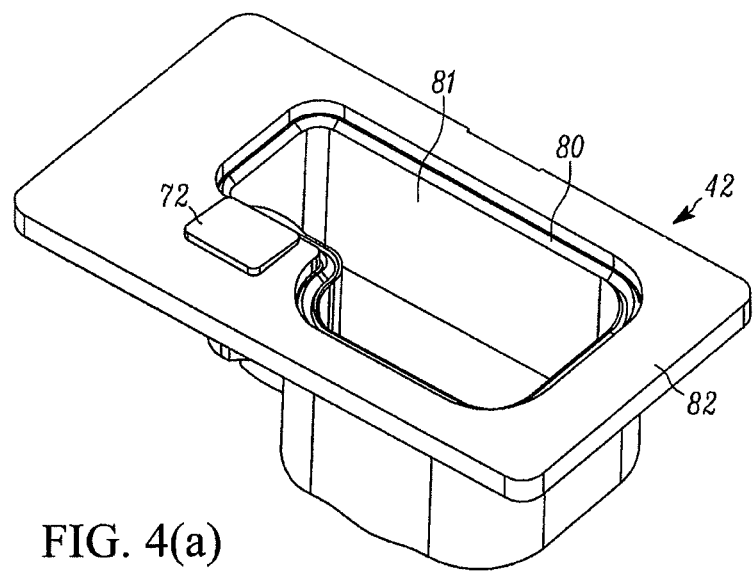
FIGS. 4(a) and 4(b) are respective-front and rear perspective views of a composite lens for the photoelectric sensor shown in FIG. 2.
Figure 4B:
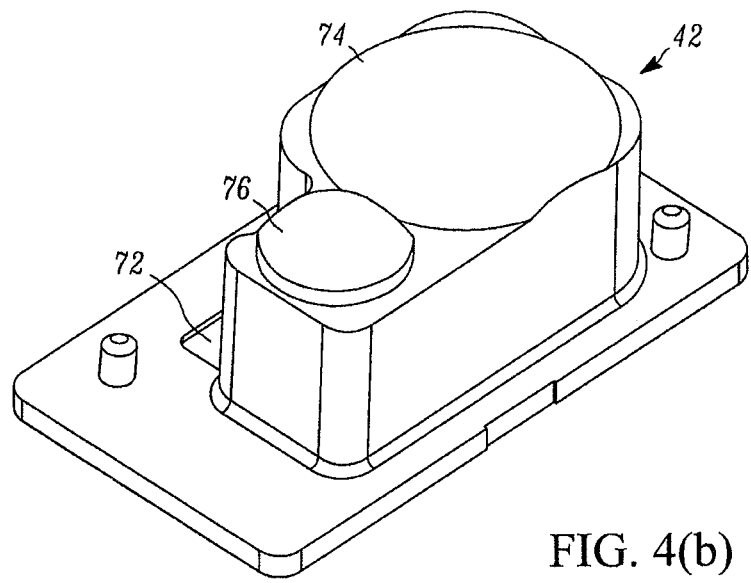

As best shown in FIGS. 4(a) and 4(b), which respectively show front and rear perspective views of the composite lens 42, the composite lens includes an emit area 72, a first receive lens 74, and a second receive lens 76. The emit area 72 allows light from the light source 34 to pass out of the photoelectric sensor 30 and be directed to a predetermined target location as discussed above. By comparison, the first and second receive lenses 74, 76 are configured to direct/focus incoming light received by the photoelectric sensor 30 (e.g., diffuse reflected light reflected off of a target) toward the first and second photodetectors 36 and 38, respectively. As shown particularly in FIG. 4(b), in the present embodiment the first receive lens 74 is larger than the second receive lens 76. Further, as best seen with respect to FIGS. 5(d) and 5(c), a center of the first receive lens 74 is at a distance X from a center of the emit area 72 that is greater than the distance Y between a center of the second receive lens 76 and the center of the emit area 72.

As shown in FIG. 4(a), a cutout portion or ledge 80 in a front side 82 of the composite lens 42 allows for seating of the color filter 70. Behind the ledge 80 is positioned a receive portion 81 of the photoelectric sensor 30, at which are located the first and the second receive lenses 74 and 76. When mounted on the ledge 80, the color filter 70 acts to filter light entering the receive portion 81 of the photoelectric sensor 30 such that only light within a predetermined range of wavelengths passes through. Although shown in FIGS. 4(a) and 4(b) as being formed of a single piece of material, the composite lens 42 can be formed also as multiple pieces. The one or more pieces of the composite lens 42 can be formed using an optically transparent material such as an optical acrylic material, polystyrene material, or a polycarbonate material, and by a method such as molding. Where multiple pieces are used to form the composite lens 42, the pieces can be joined together by way of epoxy/glue, plastic welding, or other techniques.

Figure 5A:
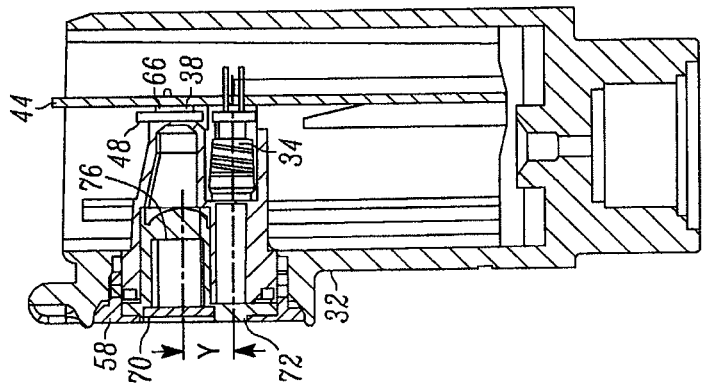
FIG. 5(a) is a front view of the photoelectric sensor shown in FIG. 2.
Figure 5A:
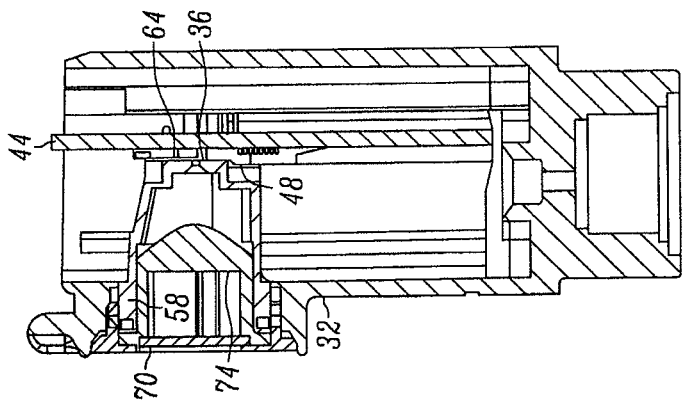
Figure 5A:
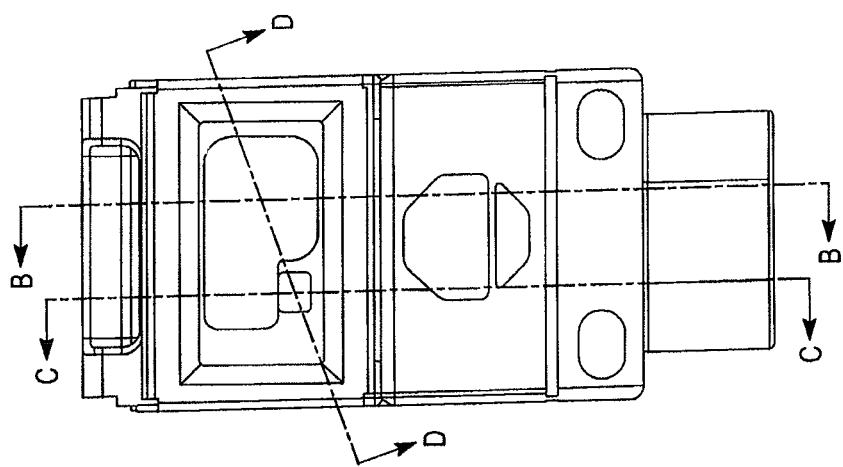
Figure 5F:
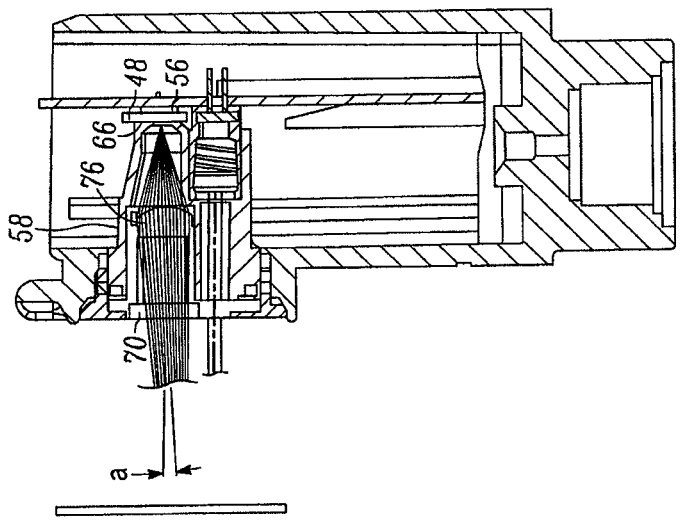
FIG. 5(f) is a cross-sectional view of the photoelectric sensor shown in FIG. 2, taken along lines D-D of FIG. 5(a) and illustrating light received by the second lens 76.
Figure 5D:
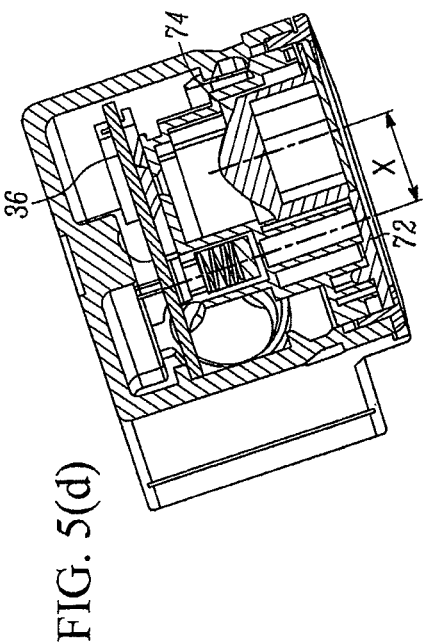

Turning to FIGS. 5(a)-5(d), a front view of the assembled photoelectric sensor 30 is provided in FIG. 5(a), and additionally first, second, and third cross-sectional views of the photoelectric sensor taken along respective lines B-B, C-C, and D-D of FIG. 5(a) are provided in FIG. 5(b), FIGS. 5(c), and 5(d) respectively. As shown particularly in FIGS. 5(b)-5(d), the first receive lens 74 is positioned adjacent to and aligned with the first photodetector 36, and the second receive lens 76 is positioned adjacent to and aligned with the second photodetector 38. Each receive lens 74 or 76 is selected to be operable with its corresponding photodetector 36 or 38 to sense the target over a corresponding range of distances of the target from the photoelectric sensor.

Figure 5E:
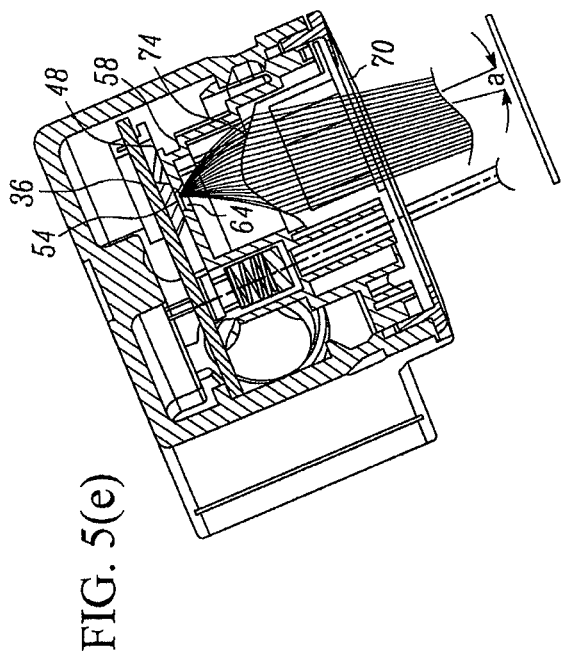
FIG. 5(e) is a cross-sectional view of the photoelectric sensor shown in FIG. 2, taken along lines C-C of FIG. 5(a) and illustrating light received by the first lens 74.

Thus, as seen with respect to FIG. 5(e), light reaching the first receive lens 74 after passing through the window 40 (and the color filter 70), subsequently passes through the first receive lens 74, the first aperture 64 of the optical holder 58 and the first aperture 54 of the copper shield 48, and is then detected by the first photodetector 36. Also, as seen with respect to FIG. 5(f), light reaching the second receive lens 76 after passing through the window 40 (and the color filter 70), subsequently passes through the second receive lens 76, the second aperture 66 of the optical holder 58 and the second aperture 56 of the copper shield 48, and is then detected by the second photodetector 38.

During operation of the photoelectric sensor 30, if the target is at a predetermined location, the first and the second photodetectors 36, 38 each detects a respective portion of the light reflected by the target. The amount of the reflected light detected by each respective one of the photodetectors 36, 38 depends on the distance that a target is from the sensor 30, and the size and arrangement of each lens 74, 76, and the size and arrangement of the apertures 64, 66. If the target is at the predetermined location at a distance from the sensor which is within a first range, a first portion of light emitted by the light source is received by the first photodetector after being reflected off of the target and passing through the first receive lens and the first aperture. If the target is at the predetermined location at a distance from the sensor which is within a second range, a second portion of light emitted by the light source is received by the second photodetector after being reflected off of the target and passing through the second receive lens and the second aperture.

For example, in the present embodiment, the first range and the second ranges overlap each other, and the first range can extend from around 50 mm to 1000 mm, and the second range can extend from around 0 mm to around 300 mm. In this case, if the predetermined location of the target is at a distance from the sensor 30 which is within the first range but not within the second range, such as when the target is at a predetermined location that is near a maximum sensing distance of the photoelectric sensor 30, such as 800 mm, the first photodetector 36 receives a first portion of emitted light reflected from the target which passes through the first receive lens, and the second photodetector 38 does not receive emitted reflected light (i.e., the reflected emitted light is blocked by aperture 66). If the predetermined location of the target is at a distance from the sensor 30 which is within the second range but not within the first range, such as when the target is at a predetermined location that is near a minimum sensing distance of the photoelectric sensor 30, such as 5 mm, the second photodetector 38 receives a second portion of emitted light reflected from the target which passes through the second receive lens, and the first photodetector 36 does not receive emitted reflected light (i.e., the reflected emitted light is blocked by aperture 64). If the target is at the predetermined location which is at a distance from the sensor 30 which is within the first range and within the second range, then both the first photodetector and the second photodetector receive respective portions of emitted reflected light.

In this manner, the photoelectric sensor 30 is operable in connection with a target at a sensing distance that can range from a high value, such as for example around 1000 mm, to a low value. Preferably, although not necessarily, the low value sensing distance (i.e., the minimum sensing distance) is zero or approximately zero, such that the photoelectric sensor 30 is operable to detect a target that is directly adjacent the window frame 68.

Figure 6:
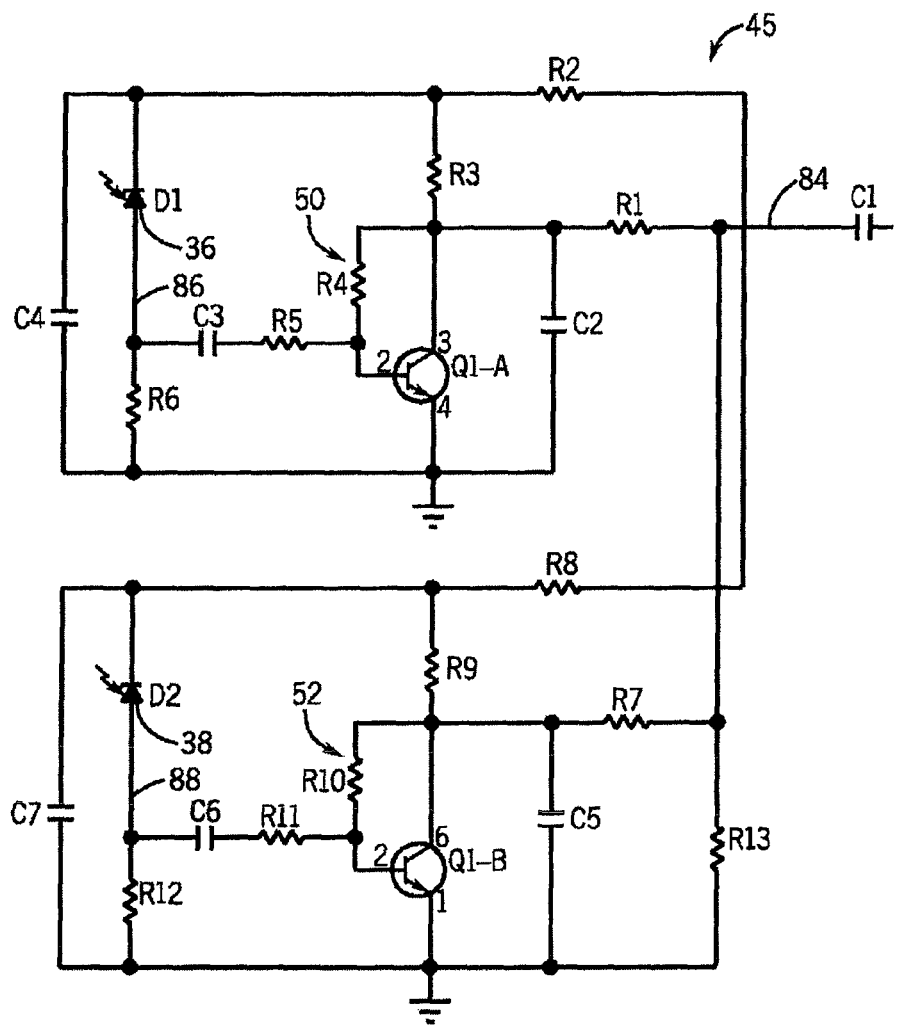
FIG. 6 is a circuit diagram of an output circuit for receiving signals from the first and the second photodetectors.

Referring to FIG. 6, a circuit diagram of the output circuit 45 including the first and the second photodetectors 36, 38 is shown. In addition to the photodetectors 36, 38, the output circuit 45 also includes transistor amplifiers Q1-A and Q1-B, as well as the first and second resistors 50 and 52 mentioned above. Additional resistors and capacitors are also included in the output circuit 45 for purposes such as biasing, filtering and other functions. In particular, first and second nodes 86 and 88 existing at the respective anodes of the first and second photodetectors 36 and 38, respectively, are coupled to the respective bases of the respective amplifiers Q1-A and Q1-B (which in the present embodiment are NPN bipolar junction transistors) by respective capacitors and resistors. The respective first and second resistors 50 and 52 are coupled between the respective bases and respective collectors of the respective amplifiers Q1-A and Q1-B.

An output port 84 of the output circuit 45, which is coupled indirectly (by way of resistors) to both of the collectors of the amplifiers Q1-A and Q1-B, provides an output signal that is indicative of the absence or presence of the target at a predetermined location as determined based upon the reflected light that is sensed by the first and/or second photodetectors 36, 38. Specifically, the first photodetector 36 produces a first quantification signal at the node 86 indicative of the amount of light detected by it, and the second photodetector 38 produces a second quantification signal at the node 88 indicative of the amount of light detected by it. The signals from the respective first and second photodetectors 36, 38 are individually amplified by the transistor amplifiers Q1-A and Q1-B, respectively, with the resultant signals added together to produce a sum as the output signal at the output port 84. The amount of amplification provided by the respective amplifiers Q1-A and Q1-B depends on the values selected for the first and second resistors 50, 52. In the illustrated embodiment, the resistor 50 has a value of 47 k ohms, and the resistor 52 has a value of 56 k ohms, which corresponds to the sizes of the lenses 74 and 76, and the smoothness of a final combined margin curve. Specifically, in the illustrated embodiment, the distance X in FIG. 5(d) is 12.58 mm, and the distance Y in FIG. 5(c) is 6.51 mm.

The output signal provided at the output port 84 can be a voltage signal or a current signal. When at a first level, the output signal provided at the output port 84 indicates the presence of the target at the predetermined location and, when at a second level, the output signal provided at the output port 84 indicates the absence of the target at the predetermined location. Notwithstanding the particular output circuit 45 shown in FIG. 6, in alternate embodiments other output circuits can instead be employed for generating one or more other types of output signals including, for example, an output signal that provides a linear output related to the amount (intensity) of the measured light.

Figure 7A:
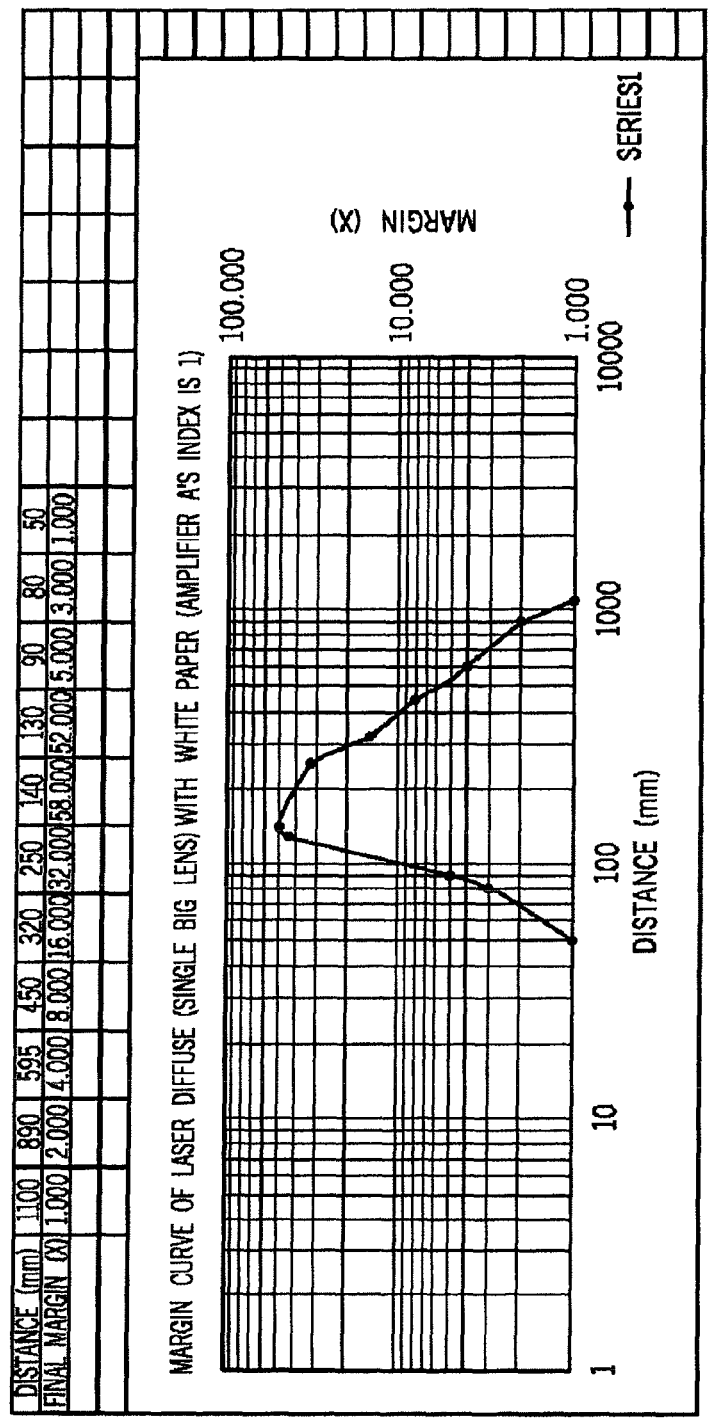
FIGS. 7(a) and 7(b) are first and second exemplary margin curves for a first exemplary photoelectric sensor having a single big lens and a second exemplary photoelectric sensor having a single small lens, respectively, assuming that white paper is used as the reflective target.
Figure 7B:
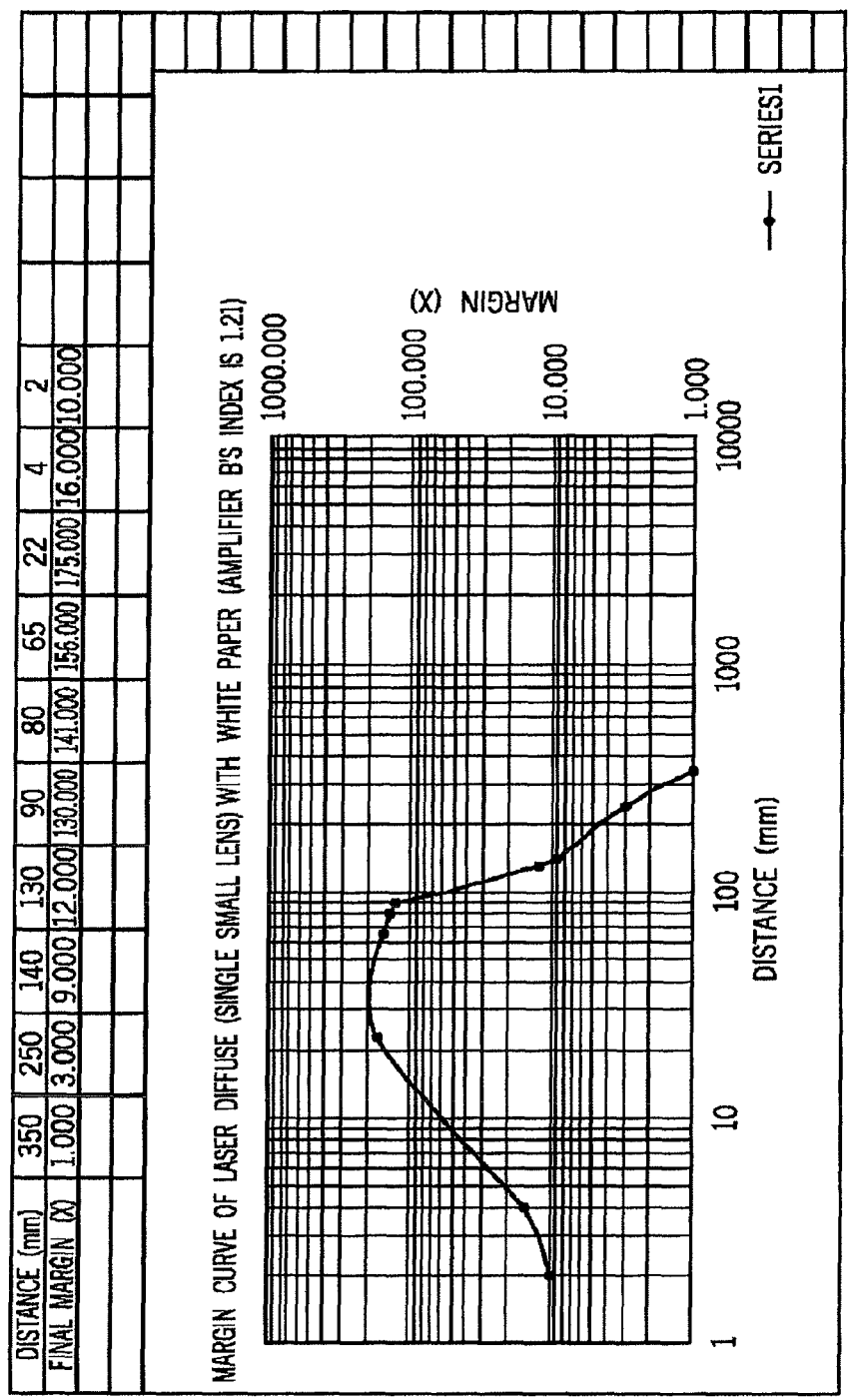

FIG. 7(a) shows an exemplary margin curve for a photoelectric sensor having a single big lens like that of the first receive lens 74 and a single photodetector, like photodetector 36, and using white paper with 90% reflectivity as the target. As shown, the margin is greater than one for a sensing range extending from 50 mm to a little over 1000 mm. Similarly, FIG. 7(b) shows an exemplary margin curve for a photoelectric sensor having a single small lens like that of the second receive lens 76 and a single photodetector, like photodetector 38, and using white paper with 90% reflectivity as the target. As shown, the margin is greater than one for a sensing range extending from 2 mm (or less) to around 330 mm. Each lens and photodetector combination separately achieves sensing ranges encompassing either a close range or a far range.

Figure 8:
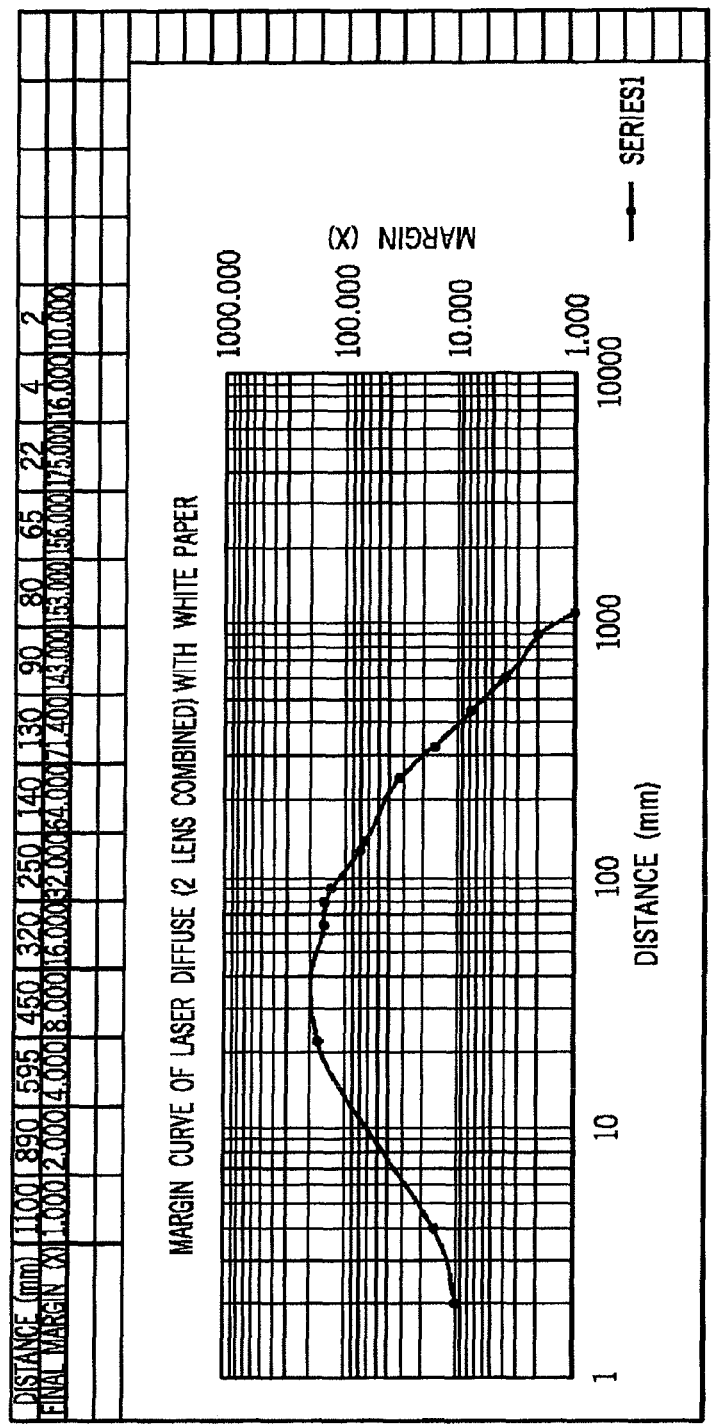
FIG. 8 is a further exemplary margin curve for an additional exemplary photoelectric sensor using white paper as the reflective target.

In contrast, FIG. 8 is an exemplary margin curve for a photoelectric sensor such as the photoelectric sensor 30 shown in FIG. 2, which includes the two photodetectors 36, 38 and associated receive lenses 74, 76, again using white paper with 90% reflectivity as the reflective target. As shown, the margin exceeds one over an operational sensing range that extends from 0 mm to 1000 mm. Thus a photoelectric sensor such as the photoelectric sensor 30 having two lenses and two photodetectors is advantageous in that its target sensing range can effectively encompass both greater distances and smaller distances from the photoelectric sensor (e.g., where the range extends to a distance of zero).

In addition to being able to effectively sense targets over a wide range of distances, a photoelectric sensor such as the photoelectric sensor 30 having two photodetectors and two associated receive lenses also is operable in the presence of environmental ambient light of 50,000 lux. This means that the sensor 10 meets certain standards set for photoelectric sensors. For example, CE marking is a declaration by the manufacturer that a product meets all the appropriate provisions of the relevant legislation implementing certain European Directives. The initials "CE" do not stand for any specific words but are a declaration by the manufacturer that its product meets the requirements of the applicable European Directive. CE marking gives companies easier access into the European market to sell their products without adaptation or rechecking. The photoelectric sensor 30 meets CE provisions relating to its operation under an electromagnetic interference test and with environmental (ambient) light of up to 5000 lux. In particular, the CE standard (IEC 60947-5-2 (2004)) for a diffuse sensor having a sensing range extending greater than 400 mm requires reliable operation with a 5,000 lux environmental light directed to the sensor with a greater than 15 degree angle.

The above description is in the context of an exemplary diffuse type photoelectric sensor for sensing the presence of targets, although other types of sensors for sensing other characteristics of targets are also contemplated as being within the scope of the invention. Also, while the photoelectric sensor 30 described above employs two photodetectors and two associated receive lenses, the present invention is also intended to encompass other embodiments in which there are more than two photodetectors and/or more than two associated receive lenses. For example, in one alternate embodiment there can be three photodetectors. Also, the present invention is intended to encompass photoelectric sensors employing electric circuits other than that shown in FIG. 6, including embodiments where multiple output signals are provided and/or where the output signals are provided to a variety of other devices including various computer networks, transmitters (e.g., for wireless transmission), and processing devices.

Further, while in at least some embodiments the photoelectric sensor serves to determine, as one characteristic of a target, whether the target is present at or absent from a particular predetermined location (e.g., a location along a target pathway), in additional embodiments the photoelectric sensor can also determine one or more other characteristics including, for example, characteristics concerning the shape, color or reflectivity of the target. Also, in at least some embodiments the photoelectric sensor is able to determine the proximity of the target relative to the photoelectric sensor. In at least some additional embodiments, it is possible that various operational characteristics of the photoelectric sensor can be varied in time. For example, in some embodiments, the relative positioning or orientation of the multiple receive lenses can be modified over time, or other optical characteristics of the photoelectric sensor can be modified over time.

It is specifically intended that the present invention not be limited to the embodiments and illustrations contained herein, but include modified forms of those embodiments including portions of the embodiments and combinations of elements of different embodiments as come within the scope of the following claims.

We claim:

1. A photoelectric sensor for sensing a target at a predetermined location within first and second ranges that partly overlap, the sensor comprising:
   a light source that emits light;
   an output circuit including first and second photodetectors;
   a first receive lens positioned adjacent to the first photodetector;
   a second receive lens positioned adjacent to the second photodetector;
   a support structure for supporting each of the light source, the photodetectors, and the receive lenses in relation to one another, and that additionally includes at least one aperture;
   wherein the sensor is configured so that, if the target is at the predetermined location, then a first portion of light emitted by the light source is received by the first photodetector after being reflected off of the target and passing through the first receive lens, and a second portion of light emitted by the light source is received by the second photodetector after being reflected off of the target and passing through the second receive lens, and the output circuit produces a first output signal indicative of a sensed characteristic of the target based on signals generated by the first and the second photodetectors in response to the portions of light received by the photodetector; and
   wherein the sensor is additionally configured so that, if the target is at another location that is one of within the first range but not within the second range or within the second range but not within the first range, then the at least one aperture performs blocking of light so that the output circuit produces a second output signal that is only indicative of an additional portion light emitted by the light source that is received by one of the first and second photodetectors after being reflected off of the target and passing through one of the first and second receive lenses but not indicative of any further portion of light emitted by the light source that is received by the other of the photodetectors after being reflected off of the target.

2. The photoelectric sensor of claim 1, wherein the light source is a laser.

3. The photoelectric sensor of claim 2, wherein the first receive lens and the second receive lens are formed as a composite lens and the composite lens further includes an emit area through which the emitted light passes.

4. The photoelectric sensor of claim 1, wherein the first receive lens and the second receive lens are formed as a composite lens.

5. The photoelectric sensor of claim 1, wherein the first receive lens and the second receive lens are formed from a polystyrene material.

6. The photoelectric sensor of claim 1, wherein the first output signal is indicative of one of a presence and an absence of the target at the predetermined location.

7. The photoelectric sensor of claim 1, wherein the output circuit includes a first amplifier for amplifying a first signal from the first photodetector and a second amplifier for amplifying a second signal from the second photodetector.

8. The photoelectric sensor of claim 7, wherein an amplification factor of the first amplifier and an amplification factor of the second amplifier are independent of each other.

9. The photoelectric sensor of claim 7, wherein the output circuit further includes a means for adding together the amplified first signal and the amplified second signal.

10. The photoelectric sensor of claim 1, further including an optical holder for holding the first receive lens and the second receive lens.

11. The photoelectric sensor of claim 10, wherein the optical holder includes a first aperture aligned with the first photodetector and a second aperture aligned with the second photodetector, the first and second apertures being comprised by the at least one aperture.

12. The photoelectric sensor of claim 1, wherein the first photodetector and the second photodetector are situated on a printed circuit board, and wherein the output circuit is also situated on the printed circuit board.

13. The photoelectric sensor of claim 1, wherein the sensor further comprises a shield for shielding the output circuit and wherein the shield has a first aperture and a second aperture, with the first aperture aligned with the first photodetector and the second aperture aligned with the second photodetector.

14. The photoelectric sensor of claim 1, wherein the first receive lens and the second receive lens are formed from a polycarbonate material.

15. The photoelectric sensor of claim 1, wherein the at least one aperture includes a first aperture positioned between the first receive lens and the first photodetector and second aperture positioned between the second receive lens and the second photodetector, and wherein the first aperture performs the blocking of light when the target is at the other location, and the second aperture performs additional blocking of light when the target is at a further location that is within the second of the ranges but not the first of the ranges.

16. A diffuse type photoelectric sensor for sensing a target at a predetermined location at a distance from the sensor, the sensor comprising:

a light source for emitting light;
an output circuit including a first photodetector and a second photodetector;
a first receive lens positioned adjacent to the first photodetector;
a second receive lens positioned adjacent to the second photodetector;
an optical holder for holding the first receive lens and the second receive lens, the optical holder including a first aperture and a second aperture;
wherein if the distance from the sensor is within a first range, then a first portion of light emitted by the light source is received by the first photodetector after being reflected off of the target and passing through the first receive lens and the first aperture, and if the distance from the sensor is within a second range, then a second portion of light emitted by the light source is received by the second photodetector after being reflected off of the target and passing through the second receive lens and the second aperture;
wherein the first range and the second range at least partly overlap;
wherein an output signal produced by the output circuit indicative of a sensed characteristic of the target is based on both first and second signals generated by the first and the second photodetectors respectively in response to the portions of light received by the photodetectors when the distance is within each of the first range and the second range,
wherein, due to first blocking performed by first aperture, the output signal produced by the output circuit is based upon only the second signal generated by the second photodetector when the distance is within the second range, but not the first range; and
wherein, due to second blocking performed by the second aperture, the output signal produced by the output circuit is based upon only the first signal generated by the first photodetector when the distance is within the first range, but not the second range.

17. The photoelectric sensor of claim 16, wherein the first receive lens and the second receive lens are formed as a composite lens.

18. The photoelectric sensor of claim 16, wherein the output circuit includes a first amplifier for amplifying a first signal from the first photodetector and a second amplifier for amplifying a second signal from the second photodetector.

19. The photoelectric sensor of claim 18, wherein an amplification factor of the first amplifier and an amplification factor of the second amplifier are independent of each other.

20. The photoelectric sensor of claim 19, wherein the output circuit further includes a means for adding together the amplified first signal and the amplified second signal.

21. The photoelectric sensor of claim 16, wherein the first aperture is positioned between the first receive lens and the first photodetector and second aperture positioned between the second receive lens and the second photodetector.

22. A method for detecting a presence of a target at a predetermined location from a photoelectric sensor, the method comprising:

emitting light from a light source to be reflected by the target at the predetermined location that is within one or both of first and second ranges that at least partly overlap; and
if the predetermined location is within both of the first and second ranges, then:
receiving by a first photodetector a first portion of the emitted reflected light after passing through a first receive lens, the first portion of the emitted reflected light passing through a first aperture as the first portion proceeds from the first receive lens to the first photodetector;

receiving by a second photodetector a second portion of the emitted reflected light after passing through a second receive lens, the second portion of the emitted reflected light passing through a second aperture as the second portion proceeds from the second receive lens to the second photodetector;

producing a first signal indicative of the first portion of the emitted reflected light using the first photodetector due to the first photodetector receiving the first portion of the emitted reflected light;

producing a second signal indicative of the second portion of the emitted reflected light using the second photodetector due to the second photodetector receiving the second portion of the emitted reflected light; and generating an additional signal based upon both of the first and the second signals, the additional signal being indicative of the target being at the predetermined location within both of the first and second ranges; or if the predetermined location is within the first range, but not the second range, then:

receiving by the first photodetector a further portion of the emitted reflected light after passing through the first receive lens, the further portion of the emitted reflected light passing through the first aperture as the further portion proceeds from the first receive lens to the first photodetector; and generating a further signal indicative of the further portion of the emitted reflected light due to the first photodetector receiving the further portion of the emitted reflected light;

wherein, due to blocking performed by the second aperture, the further signal is only indicative of the further portion of the emitted reflected light that is received by the first photodetector, but not indicative of any additional portion of the emitted reflected light that is received by the second photodetector.

23. The method of claim 22, wherein either a first portion of the first range is closer to the photoelectric sensor than the second range, or a second portion of the second range is closer to the photoelectric sensor than the first range and wherein at least one of the first signal, the second signal, and the further signal is or is based upon at least one quantification signal produced by at least one of the photodetectors.

* * * * *